United States Patent
Okuda

(10) Patent No.: US 10,052,942 B2
(45) Date of Patent: Aug. 21, 2018

(54) STRUCTURE OF MOUNTING POWER CONTROL DEVICE IN VEHICLE

(71) Applicant: Toyota Jidosha Kabushiki Kaisha, Toyota-shi Aichi-ken (JP)

(72) Inventor: Yuya Okuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/866,980

(22) Filed: Jan. 10, 2018

(65) Prior Publication Data

US 2018/0201108 A1  Jul. 19, 2018

(30) Foreign Application Priority Data

Jan. 19, 2017 (JP) .................................. 2017-007805

(51) Int. Cl.
*B60K 1/00* (2006.01)
*B60L 11/18* (2006.01)
*B60K 1/04* (2006.01)

(52) U.S. Cl.
CPC ............ *B60K 1/00* (2013.01); *B60L 11/1803* (2013.01); *B60K 2001/0411* (2013.01)

(58) Field of Classification Search
CPC ... B60R 16/0207; B60R 16/0238; B60K 6/40; B60K 6/405; B60L 15/007
See application file for complete search history.

(56) References Cited

U.S. PATENT DOCUMENTS

| | | | | |
|---|---|---|---|---|
| 8,485,292 | B2* | 7/2013 | Wakatsuki | B60K 11/02 123/41.44 |
| 2013/0106141 | A1* | 5/2013 | Yamashita | B60R 19/18 296/193.09 |
| 2017/0246934 | A1* | 8/2017 | Lee | B60H 1/3229 |
| 2017/0297513 | A1* | 10/2017 | Katano | |
| 2017/0355272 | A1* | 12/2017 | Baba | B60K 6/22 |
| 2018/0056901 | A1* | 3/2018 | Ando | B60R 16/0239 |

FOREIGN PATENT DOCUMENTS

| | | |
|---|---|---|
| JP | 2012095482 A | 5/2012 |
| JP | 2013095153 A | 5/2013 |
| JP | 2015133803 A | 7/2015 |
| JP | 2018-023217 A | 2/2018 |

* cited by examiner

*Primary Examiner* — Bryan A Evans
(74) *Attorney, Agent, or Firm* — Dinsmore & Shohl LLP

(57) ABSTRACT

A structure of mounting a power controller in a vehicle, the power controller to be mounted in a front compartment of the vehicle: includes a connector attached to a back portion of a housing of the power controller; a cowl panel positioned behind the connector; and a pair of protrusions provided on the housing. Each of the pair of protrusions is arranged on a corresponding lateral side of the connector. Back ends of the protrusions are positioned on a back side with respect to a back end of the connector. A distance from the back end of one protrusion of the pair of protrusions to the cowl panel is shorter than a distance from the back end of the other protrusion to the cowl panel, the one protrusion being closer to a center line in a width direction of the vehicle than the other protrusion is.

3 Claims, 6 Drawing Sheets

STRUCTURE OF MOUNTING POWER CONTROL DEVICE IN VEHICLE

CROSS-REFERENCE TO RELATED APPLICATIONS

This application claims priority to Japanese Patent Application No. 2017-007805 filed Jan. 19, 2017, which is herein incorporated by reference.

TECHNICAL FIELD

The present disclosure relates to a structure of mounting a power controller in a vehicle, the power controller being configured to control power supplied to a traction motor.

DESCRIPTION OF RELATED ART

Various devices are mounted in a front compartment of automobiles. Some of the devices mounted in the front compartment are arranged in front of a cowl panel (refer, for example, to Japanese Patent Application Publication No. 2013-095153). The cowl panel is positioned between a back end of the front compartment and a front edge of a windshield of a vehicle, and coupled at its both ends to suspension towers or front pillars.

Meanwhile, in many of electric cars including a traction motor, a power controller configured to control power supplied to the traction motor is mounted in the front compartment. In the power controllers described in Japanese Patent Application Publication No. 2015-133803 and Japanese Patent Application Publication No. 2012-095482, a connector is attached to a back side on an upper surface or to a back surface of the power controller. Note that, the "electric cars" herein encompass automobiles including both the traction motor and an engine.

SUMMARY

Owing to restrictions in a layout of the front compartments, and on a layout of components in the power controllers, the connector may need to be attached to a back portion of a housing of the power controller, and hence the cowl panel may be positioned behind the connector. In a case where a vehicle collides against an obstacle ahead, the power controller mounted in the front compartment may be thrusted back by an impact of the collision. In a case where the power controller is thrusted back, the connector attached to the back portion of the housing of the power controller may interfere with the cowl panel, and the connector may be damaged. Meanwhile, the power controller includes a capacitor that is charged by a battery configured to store power supplied to the traction motor, and a discharge circuit configured to discharge the capacitor in case of a collision. In case of the collision, the power controller receives a discharge command from the other device via the connector, and causes the discharge circuit to discharge the capacitor. When the connector is damaged in case of the collision, the discharge command may fail to be transmitted to the discharge circuit, and that the discharge of the capacitor may not be effected. According to teachings disclosed herein, there is provided a technology of protecting a connector on a back portion on an upper surface of a power controller from interfering with a cowl panel in the case where the power controller is thrusted back.

A structure of mounting a power controller in a vehicle is disclosed herein. In the structure, the power controller may be mounted in a front compartment of the vehicle. The structure may comprise a connector attached to a back portion of a housing of the power controller, a cowl panel located behind the connector, and a pair of protrusions provided on the housing. Each of the pair of protrusions may be arranged on a corresponding lateral side of the connector when viewed from a front of the vehicle. Back ends of the protrusions may be positioned on a back side with respect to a back end of the connector. A distance from the back end of one protrusion of the pair of protrusions to the cowl panel may be shorter than a distance from the back end of the other protrusion to the cowl panel, the one protrusion being closer to a center line in a width direction of the vehicle than the other protrusion is.

In this mounting structure, in a case where the power controller is thrusted back by an impact of a collision, the pair of protrusions on the corresponding lateral sides of the connector is brought into contact with the cowl panel earlier than the connector, thereby the protrusions may push back the cowl panel. With this, the connector is protected. Further, this structure has an advantage as follows. Specifically, the cowl panel is fixed to the vehicle at its both ends in the width direction of the vehicle, and hence a strength of the cowl panel against a load in a front-and-back direction becomes higher toward the ends of the cowl panel. In other words, the strength of the cowl panel becomes lower toward the center line in the width direction of the vehicle. Accordingly, in the mounting structure disclosed herein, the pair of protrusions are arranged such that the distance from the back end of the one protrusion of the pair of protrusions to the cowl panel is shorter than the distance from the back end of the other protrusion to the cowl panel, the one protrusion being closer to the center line in the width direction of the vehicle than the other protrusion is. With this structure, the one protrusion is brought into contact with the cowl panel earlier than the other protrusion does, the one protrusion being closer to the center line in the width direction of the vehicle than the other protrusion is. In other words, the one protrusion comes into contact earlier with a low-strength part of the cowl panel, and starts to push the cowl panel backward. With this, loads to be applied to the pair of protrusions are balanced, and prevented from being applied excessively to either one of the protrusions. As a result, either one of the protrusions is prevented from being broken, and hence the cowl panel is prevented from interfering with the connector. Details and further improvements of the technology disclosed herein will be described in "EMBODIMENT" below.

EMBODIMENT

Representative, non-limiting examples of the present disclosure will now be described in further detail with reference to the attached drawings. This detailed description is merely intended to teach a person of skill in the art further details for practicing aspects of the present teachings and is not intended to limit the scope of the disclosure. Furthermore, each of the additional features and teachings disclosed below may be utilized separately or in conjunction with other features and teachings to provide improved structure for mounting power controller in vehicle.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
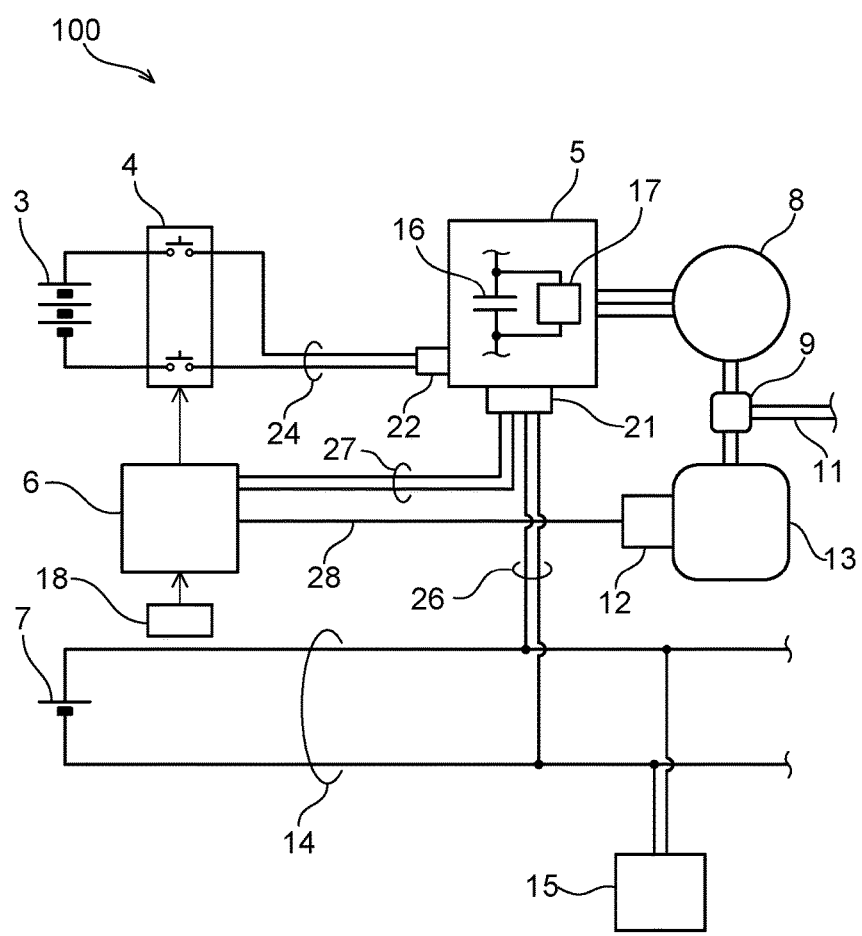
FIG. 1 is a block diagram of a power system of a hybrid car applying a mounting structure according to an embodiment.

A mounting structure according to an embodiment of the present technology will be described with reference to the drawings. The mounting structure according to the embodiment is applied to a hybrid car 100 including a traction motor and an engine. First, a power system of the hybrid car 100 will be described. FIG. 1 is a block diagram of the power system of the hybrid car 100. Note that, in the block diagram of FIG. 1, some components that are unnecessary for the description of the technology disclosed herein are not shown.

The hybrid car 100 includes an electric motor 8 for driving (traction motor 8) and an engine 13. In the following, for the sake of simplicity of description, the traction motor 8 will be simply referred to as a motor 8. A power controller 5 is connected to the motor 8. The power controller 5 controls power supplied to the motor 8. Specifically, the power controller 5 converts DC power from a high-voltage battery 3 to AC power for the motor driving. Output from the motor 8 and output from the engine 13 are combined with each other by a power distribution mechanism 9, and output to an axle 11. The power distribution mechanism 9 may distribute an output torque from the engine 13 to the axle 11 and the motor 8. The motor 8 generates power with part of the output torque from the engine 13 at this time. Further, the motor 8 also generates power by utilizing kinetic energy of the vehicle when a driver steps on the brake pedal. The power obtained by such power generation (regenerative power) is supplied to the high-voltage battery 3 via the power controller 5. This AC regenerative power generated by the motor 8 is converted to DC power and supplied to the high-voltage battery 3 by the power controller 5.

An engine controller 12 is attached to a housing of the engine 13. The engine controller 12 is connected, via an engine wire harness 28, to an HV controller 6 configured to control an entirety of the vehicle. The engine wire harness 28 is a bundle of communication cables that transmits various signals between the HV controller 6 and the engine controller 12.

The power controller 5 includes a voltage converter circuit and an inverter circuit. The voltage converter circuit step up a voltage of the power from the high-voltage battery 3 to a voltage suited to drive the motor 8. The output voltage from the high-voltage battery 3 is, for example, 300 volts, which is stepped up, for example, to 600 volts. The inverter circuit converts the DC power at the stepped-up voltage to three-phase AC power having a frequency suited to drive the motor 8. The inverter circuit also has a function to convert the AC power generated by the motor 8 to the DC power. The voltage converter circuit also has a function to step down a voltage of the DC power generated by the DC conversion by the inverter circuit to the voltage of the high-voltage battery 3. In other words, the voltage converter circuit built in the power controller 5 is a bidirectional DC-DC converter. The voltage converter circuit and the inverter circuit are not described in detail herein.

The power controller 5 includes a capacitor 16 that smooths a current from the high-voltage battery 3. The power controller 5 also includes a discharge circuit 17 that discharges the capacitor 16 in case of a collision of the vehicle. The discharge circuit 17 is, for example, a discharge resistor. Alternatively, the voltage converter circuit and the inverter circuit described above may be utilized as a discharge circuit.

The capacitor 16 is in a state being charged by the high-voltage battery 3. The discharge circuit 17 discharges the capacitor 16 in case of a collision so as to secure safety of the power controller 5. A discharge command for activating the discharge circuit 17 is transmitted from the HV controller 6 to the power controller 5 so as to discharge the capacitor 16. When the HV controller 6 receives a signal that represents a collision of the vehicle from an airbag controller 18, the HV controller 6 transmits the discharge command to the power controller 5. Simultaneously, the HV controller 6 opens a system main relay 4 electrically connecting the high-voltage battery 3 and the power controller 5 to each other. When the system main relay 4 is opened, the power controller 5 is disconnected from the high-voltage battery 3, and the power supply to the capacitor 16 is stopped. With this, the capacitor 16 can be discharged. Note that, the airbag controller 18 includes an acceleration sensor that detects the collision. When the acceleration sensor detects a predetermined acceleration or more, the acceleration sensor transmits the signal that represents a collision of the vehicle to the HV controller 6.

The high-voltage battery 3 and the power controller 5 are connected to each other via high-voltage power lines 24. One ends of the high-voltage power lines 24 are connected to a high-voltage connector 22, and the high-voltage connector 22 is attached to the power controller 5. In other words, the high-voltage power lines 24 and the high-voltage connector 22 allow the power from the high-voltage battery 3 to be transmitted to the power controller 5. The system main relay 4 is provided on the high-voltage power lines 24.

The power controller 5 also houses a control circuit that is driven at low voltage. The low voltage herein refers to a voltage lower than the above-mentioned output voltage from the high-voltage battery 3. In order that power is supplied also to the control circuit, the power controller 5 is connected also to an auxiliary battery 7. An output voltage from the auxiliary battery 7, which is lower than the output voltage from the high-voltage battery 3, is 12 volts, for example. The auxiliary battery 7 is connected to the power controller 5 via auxiliary common power lines 14 and low-voltage power lines 26. One ends of the low-voltage power lines 26 are connected to a low-voltage connector 21, and the low-voltage connector 21 is attached to the power controller 5. The auxiliary common power lines 14 is power lines routed in the vehicle and supplies power to various auxiliary devices. The "auxiliary devices" collectively refer to devices that are driven at the low voltage. A car navigation apparatus 15 is as an example of the auxiliary devices. The control circuit, which is implemented in the power controller 5 and driven at the low voltage, also belongs to the "auxiliary devices."

Not only the low-voltage power lines 26 but also a signal wire harness 27 is connected to the low-voltage connector 21. The signal wire harness 27 is a communication cable that transmits various signals between the power controller 5 and the HV controller 6. The above-mentioned discharge command is also transmitted from the HV controller 6 to the power controller 5 via the signal wire harness 27. In case of the collision of the vehicle, when the low-voltage connector 21 is damaged before the HV controller 6 transmits the discharge command to the power controller 5, the power controller 5 may not be properly receive the discharge command, and may fail to effect the discharge of the capacitor 16. The hybrid car 100 has a structure that makes the damage unlikely to be imposed on the low-voltage connector 21 in case of a collision from the front. Next, a structure 2 for mounting the power controller 5 in the vehicle will be described.

Figure 2:
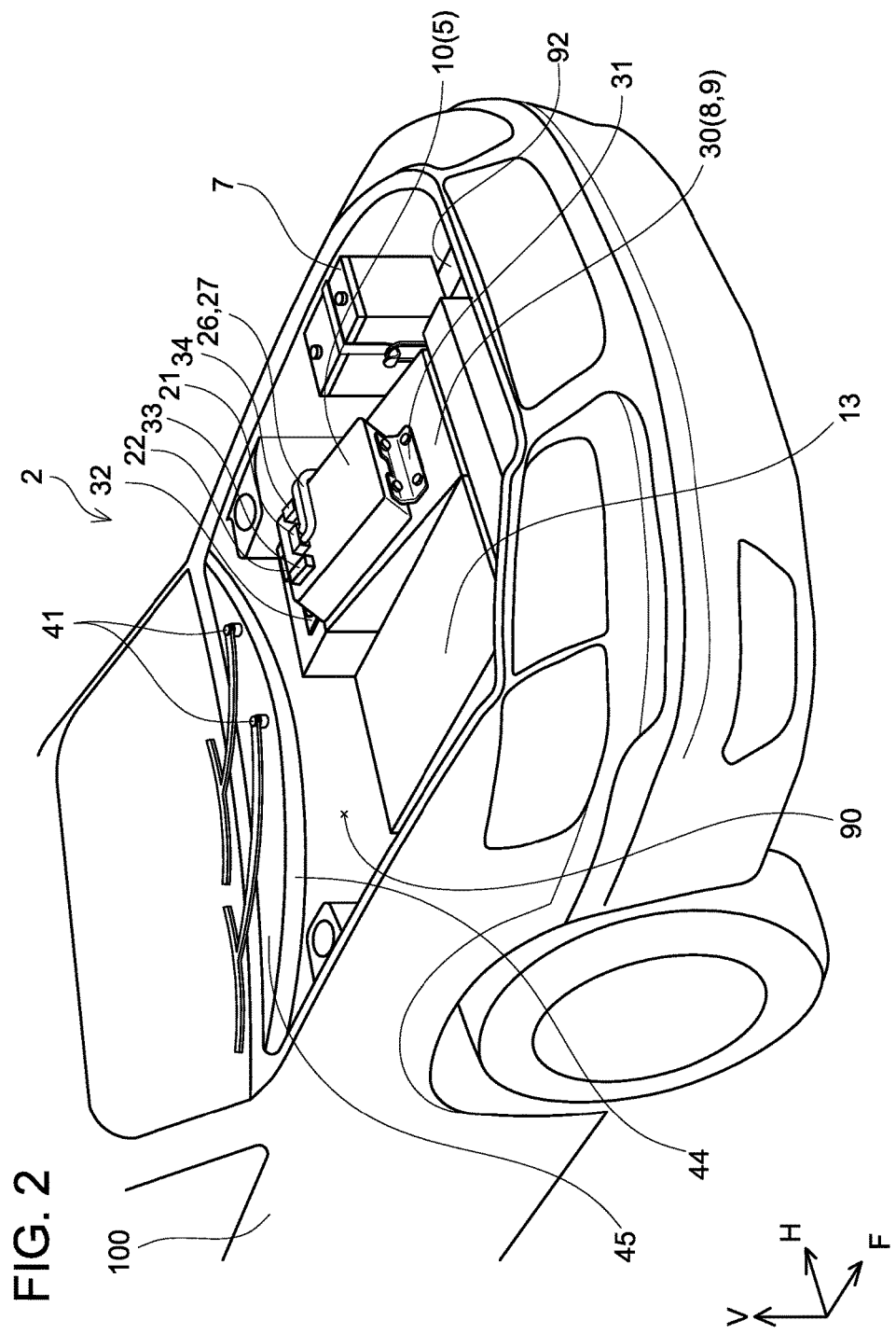
FIG. 2 is a perspective view of a front compartment of the hybrid car having the mounting structure according to the embodiment.
Figure 3:
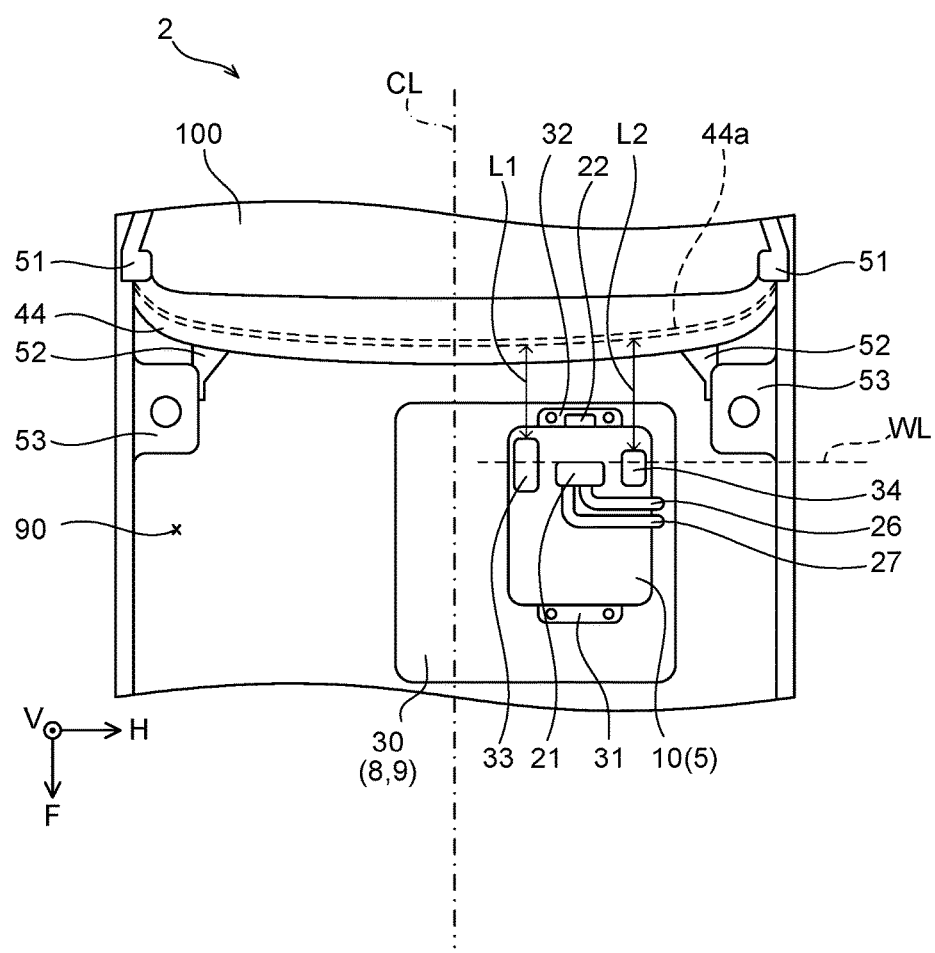
FIG. 3 is a plan view of a power controller mounted in a vehicle.
Figure 4:
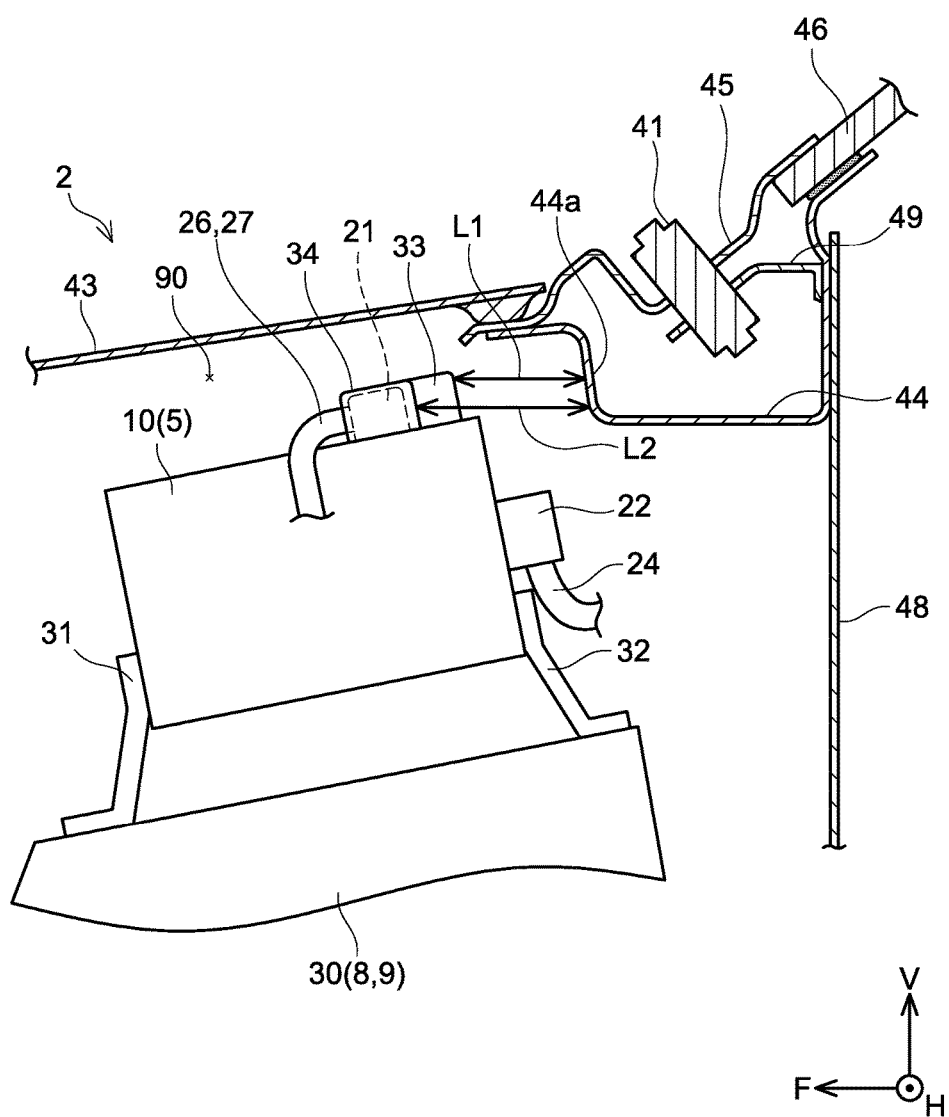
FIG. 4 is a side view of the power controller mounted in the vehicle.

With reference to FIG. 2 to FIG. 4, the structure 2 for mounting the power controller 5 in the vehicle will be described. FIG. 2 is a perspective view of a device layout in a front compartment 90 of the hybrid car 100. FIG. 3 is a plan view of the power controller 5 mounted in the front compartment 90. FIG. 4 is a side view of the power controller 5 mounted in the front compartment 90. In the plan view of FIG. 3, only the power controller 5 and its vicinity are shown. The reference numeral 43 in FIG. 4 represents a hood that covers the front compartment 90. In FIG. 2 and FIG. 3, the hood 43 is not shown. Further, the reference numeral 10 represents a housing of the power controller 5.

Now, the coordinate system in the drawings will be described. An arrow of F-axis represents a front in a front-and-back direction of the vehicle, an H-axis represents a width direction of the vehicle, and an arrow of a V-axis represents an upper side in an upper-and-lower direction of the vehicle. Hereinbelow, the "front" refers to the front in the front-and-back direction of the vehicle, and the "back" refers to a back side in the front-and-back direction of the vehicle. The front compartment 90 corresponds to a front space of the vehicle.

The front compartment 90 houses the engine 13, a transaxle 30, the power controller 5, and the auxiliary battery 7. Note that, description of other various components housed in the front compartment 90 than these components will be omitted. In addition, illustration of, for example, cables from the auxiliary battery 7 will be also omitted.

The transaxle 30 houses the motor 8, the power distribution mechanism 9, and a differential gear. In other words, the transaxle 30 serves also as a housing for the motor 8. The transaxle 30 is coupled to the engine 13 in the width direction of the vehicle. The output torque from the engine 13 and an output torque from the motor 8 are combined with each other by the power distribution mechanism 9 in the transaxle 30, and transmitted to the axle 11 via the differential gear.

The engine 13 and the transaxle 30 are suspended between two side members 92 extending in the front-and-back direction below the front compartment 90. Note that, in FIG. 2, one of the side members 92 is arranged at an invisible position. The power controller 5 is fixed onto the transaxle 30.

The housing 10 of the power controller 5 is fixed to the transaxle 30. More specifically, the housing 10 of the power controller 5 is fixed to a top of the transaxle 30 with a front bracket 31 and a rear bracket 32. As shown in FIG. 4, due to the front bracket 31 and the rear bracket 32, a clearance is secured between the housing 10 of the power controller 5 and the transaxle 30. In other words, the housing 10 of the power controller 5 is out of direct contact with the transaxle 30, and is supported by the transaxle 30 through the front bracket 31 and the rear bracket 32. With this, the power controller 5 is protected from vibration of the engine 13 and vibration of the motor 8. Note that, although not shown, vibration-proof bushes are interposed between the front bracket 31 and the housing 10 and between the rear bracket 32 and the housing 10. The housing 10 of the power controller 5 is supported by the front bracket 31 and the rear bracket 32, and hence may be thrusted back in case of receiving a collision load from the front.

The low-voltage connector 21 is attached to a back portion (back portion on an upper surface) of the housing 10 of the power controller 5. As described above, the low-voltage connector 21 refers to a connector that connect the low-voltage power lines 26, which is connected to the auxiliary battery 7, and the signal wire harness 27, which is connected to the HV controller 6, to the power controller 5.

As shown in FIG. 4, the high-voltage connector 22 is attached to a back surface of the housing 10 of the power controller 5. The high-voltage connector 22 refers to a connector that connects the high-voltage power lines 24, which are connected to the high-voltage battery 3 (FIG. 1), to the power controller 5. Note that, in FIG. 3, the high-voltage power lines 24 connected to the high-voltage connector 22 are not shown.

A metal cowl panel 44 is arranged in the front compartment 90 on the back side of the vehicle. The cowl panel 44 is coupled to a dash panel 48 that separates the front compartment 90 and a cabin from each other. The cowl panel 44 extends in the width direction of the vehicle, and coupled at its both ends to suspension towers 53 through stays 52. Further, both the ends of the cowl panel 44 are coupled also to front pillars 51.

As shown in FIG. 4, the cowl panel 44 has a shape curved to open upward in a cross-section taken along a plane expanding in the front-and-back direction of the vehicle (F-axis direction in the figure) and the upper-and-lower direction of the vehicle (V-axis direction in the figure). The "shape curved to open upward" is, in other words, a shape curved to protrude downward. A back edge of the cowl panel 44 is in contact with a lower edge of a windshield 46, and the hood 43 that covers the front compartment 90 is in contact with a front edge of the cowl panel 44 (refer to FIG. 4).

An upper portion of the cowl panel 44 opened upward is covered with a cowl top panel 45 made of resin. Further, wiper pivot s41 are arranged on the upper portion of the cowl panel 44 (inside of the curve). Each of the wiper pivot 41 is supported by a pivot holder 49, which is fixed to the cowl panel 44. The wiper pivot 41 penetrates the cowl top panel 45, and is partially exposed. Each wiper pivot 41 refers to an actuator that pivots the corresponding wiper arm. In FIG. 3, the wiper pivots 41 and the wiper arms are not shown. In FIG. 4, the wiper arms are not shown. The cowl panel 44 refers to a component configured, at a back end of the front compartment 90, to cover a gap between a back end of the hood 43 and a front end of the windshield 46, and to house each wiper pivot 41 being a main component of a wiper.

As shown in FIG. 4, the cowl panel 44 is located behind the low-voltage connector 21. A reference symbol 44a represents a part of the cowl panel 44 which faces the low-voltage connector 21 at the same height as that of the low-voltage connector 21 (facing part 44a). In FIG. 3, the facing part 44a is indicated by broken lines. The facing part 44a corresponds to a region of the cowl panel 44 which is at the same height as that of the low-voltage connector 21 and includes the same positions in the width direction of the vehicle as that of the low-voltage connector 21. If the hybrid car 100 collides against an obstacle ahead, the brackets 31 and 32 may be disengaged by an impact of the collision, and the power controller 5 may be thrusted back. If the power controller 5 is thrusted back, the low-voltage connector 21 comes into contact with the cowl panel 44 made of metal (facing part 44a). If the low-voltage connector 21 is damaged by being brought into contact with the cowl panel 44, the discharge command that is transmitted from the HV controller 6 via the signal wire harness 27 may fail to reach the discharge circuit 17 in the power controller 5. As a countermeasure, as the structure 2 for mounting the power controller 5 in the vehicle, there is employed a structure that enables the low-voltage connector 21 to avoid coming into contact with the cowl panel 44 when the power controller 5 is thrusted back.

A pair of protrusions 33 and 34 is provided on the back portion (back side on the upper surface) of the housing 10 of the power controller 5. Each of the pair of protrusions 33 and 34 is arranged at a corresponding lateral side of the low-voltage connector 21 when viewed from the front of the vehicle. As shown in FIG. 3 and FIG. 4, the pair of protrusions 33 and 34 is arranged such that back ends of the pair of protrusions 33 and 34 are positioned on a back side with respect to a back end of the low-voltage connector 21. As shown in FIG. 3, a broken line WL indicates the back end of the low-voltage connector 21. Both the back ends of the pair of protrusions 33 and 34 are positioned on the back side with respect to the broken line WL. With this, in the case where the power controller 5 is thrusted back, the pair of protrusions 33 and 34 come into contact with the cowl panel 44 earlier than the low-voltage connector 21 does. When the power controller 5 is further thrusted back, the pair of protrusions 33 and 34 pushes the cowl panel 44 backward on both the lateral sides of the low-voltage connector 21. When a strength of the cowl panel 44 is sufficient to support a load from the power controller 5, the power controller 5 is stopped from being further thrusted back. When the strength of the cowl panel 44 is insufficient to support the load from the power controller 5, the cowl panel 44 is pushed backward. In either case, even when the power controller 5 is thrusted back, the low-voltage connector 21 is protected from the contact with the cowl panel 44.

A dashed line CL in FIG. 3 indicates a center line in the width direction of the vehicle. As shown in FIG. 3 the protrusion 33 is closer to the center line CL than the protrusion 34 is. Further, as shown in FIG. 3 and FIG. 4, a distance L1 from the back end of the protrusion 33 to the cowl panel 44 (facing part 44a) is shorter than a distance L2 from the back end of the protrusion 34 to the cowl panel 44 (facing part 44a), the protrusion 33 being closer to the center line CL than the protrusion 34 is. This structure has an advantage as follows. Specifically, the cowl panel 44 is fixed to the vehicle (to suspension towers 53 or front pillars 51) at its both ends in the width direction of the vehicle, and hence the strength of the cowl panel 44 against a load in the front-and-back direction becomes higher toward the ends in the width direction of the vehicle. In other words, the strength of the cowl panel 44 becomes lower toward the center line CL in the width direction of the vehicle. Meanwhile, depending on a positional relationship between the pair of protrusions 33 and 34, in the case where the power controller 5 is thrusted back, the protrusion 33, which is closer to the center line CL than the protrusion 34 is, comes into contact with the cowl panel 44 earlier than the protrusion 34 does. In other words, the protrusion 33 comes into contact earlier with a low-strength part of the cowl panel 44, and starts to push the cowl panel 44 backward. As a result, the protrusion 33, which is closer to the center line CL than the protrusion 34 is, deforms the cowl panel 44 more largely than the protrusion 34 does. In this way, loads to be applied to the pair of protrusions 33 and 34 are equalized, and prevented from being applied excessively to either one of the protrusions 33 and 34.

Figure 5:
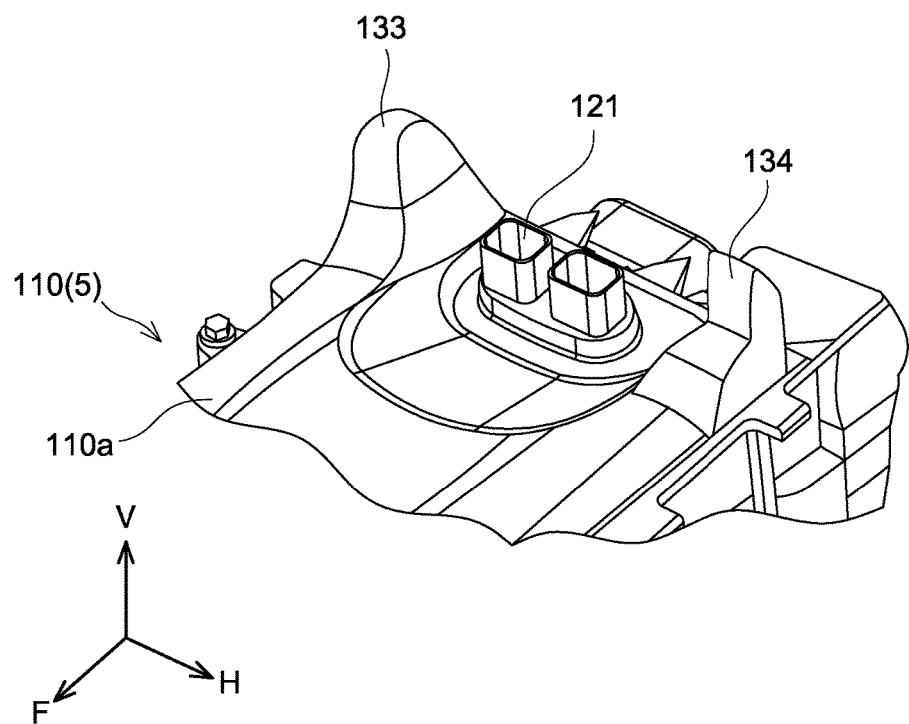
FIG. 5 is a partial perspective view of the power controller including protrusions according to a modification.

Now, with reference to FIG. 5, a modification of the protrusions 33 and 34 will be described. FIG. 5 is a partial perspective view of the power controller 5 including protrusions 133 and 134 according to the modification. In FIG. 5, cables connected to a low-voltage connector 121 are not shown. The low-voltage connector 121 is attached to a back side on an upper surface (upper cover 110a) of a housing 110 of the power controller 5. Further, the pair of protrusions 133 and 134 are provided on the upper surface (upper cover 110a) of the housing 110. Each of the pair of protrusions 133 and 134 is arranged at a corresponding lateral side of the low-voltage connector 121 when viewed from the front of the vehicle. The pair of protrusions 133 and 134 are formed integrally with the upper cover 110a. The pair of protrusions 133 and 134 are formed by injection molding of aluminum at once with the upper cover 110a. As in this modification, the pair of protrusions may be formed integrally with the upper cover, or may be attached to the upper cover with bolts or the like.

Figure 6:
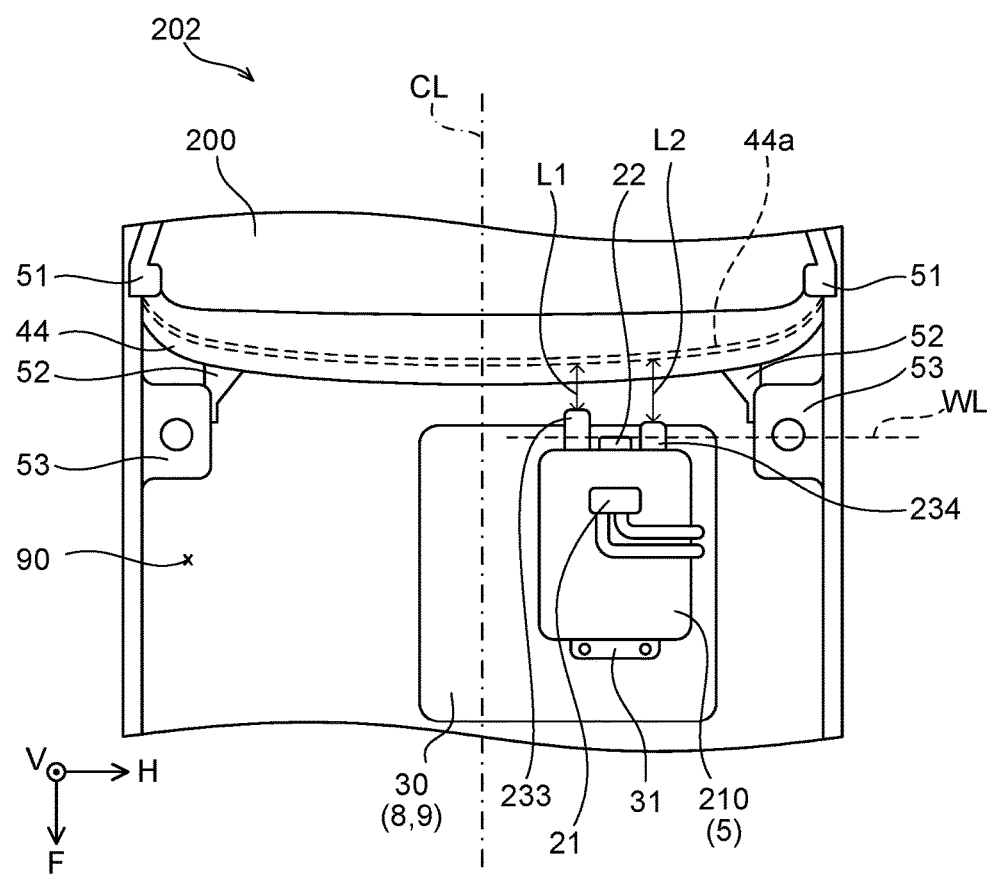
FIG. 6 is a plan view of a mounting structure according to a modification.

With reference to FIG. 6, a mounting structure 202 according to a modification will be described. The mounting structure 202 according to the modification is applied to a hybrid car 200. In this modification, the facing part 44a of the cowl panel 44 is located behind the high-voltage connector 22. Further, in this modification, the high-voltage connector 22 corresponds to a connector to be protected in the case of a collision. FIG. 6 is a plan view of the front compartment 90 of the hybrid car 200. Also in FIG. 6, as in the plan view of FIG. 3, only the power controller 5 and its vicinity are shown. In addition, in FIG. 6, like components shown in FIG. 3 are denoted by like reference symbols. The high-voltage connector 22 is attached to a back portion (back surface) of a housing 210 of the power controller 5. Further, a pair of protrusions 233 and 234 is provided on the back surface of the housing 210. Each of the pair of protrusions 233 and 234 is arranged at a corresponding lateral side of the high-voltage connector 22 when viewed from the front of the vehicle. In FIG. 6, the broken line WL indicates a back end of the high-voltage connector 22. The pair of protrusions 233 and 234 extend toward the back side with respect to the broken line WL. In other words, back ends of the protrusions 233 and 234 are positioned on the back side with respect to the high-voltage connector 22. In addition, the distance L1 from the back end of the protrusion 233 to the facing part 44a of the cowl panel 44 is shorter than a distance L2 from the back end of the protrusion 234 to the facing part 44a of the cowl panel 44, the protrusion 233 being closer to the center line CL in the width direction of the vehicle than the protrusion 234 is. The mounting structure 202 according to this modification protects the high-voltage connector 22 from interfering with the cowl panel 44 in the case of a collision. The mounting structure 202 is capable of providing the same advantages as those by the mounting structure 2 shown in FIGS. 2 to FIG. 4 with respect to the high-voltage connector 22.

Now, the features of the mounting structure 2 described in the embodiment will be summarized as follows. In the front compartment 90, the power controller 5 is fixed onto the housing (transaxle 30) that houses the traction motor 8. The power controller 5 includes the capacitor 16 that smooths the current from a DC power supply (high-voltage battery 3), and the discharge circuit 17 that discharges the capacitor 16. A wire harness (signal wire harness 27), which transmits the discharge command for causing the discharge of the capacitor 16 from another device (HV controller 6), is connected to the power controller 5 via a connector (low-voltage connector 21) attached to the back portion (back side on the upper surface) of the housing 10 of the power controller 5. In the front compartment 90, the cowl panel 44 is located behind the low-voltage connector 21. Further, the pair of protrusions 33 and 34 that protects the low-voltage connector 21 are provided on the back portion (back side on the upper surface) of the housing 10 of the power controller 5. Each of the pair of protrusions 33 and 34 is arranged on the corresponding lateral side of the low-voltage connector 21 when viewed from the front of the vehicle. The back ends of the pair of protrusions 33 and 34 are positioned on the back side of the vehicle with respect to the low-voltage connector 21. The distance L1 from the back end of the protrusion 33 to the cowl panel 44 is shorter than the distance L2 from the back end of the protrusion 34 to the cowl panel 44, the protrusion 33 being closer to the center line CL in the width direction of the vehicle than the protrusion 34 is.

Note that, with regard to the technology described in the embodiment, there is no particular problem as long as the connectors to be protected and the pair of protrusions that protect the connectors are provided on the back portion of the upper surface, back portions of lateral surfaces, or the back surface of the housing of the power controller. The mounting structure disclosed herein is applicable also to electric cars without engines.

Specific examples of the present disclosure has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A structure of mounting a power controller in a vehicle, the power controller to be mounted in a front compartment of the vehicle and configured to control power supplied to a traction motor, the structure comprising:
   a connector attached to a back portion of a housing of the power controller;
   a cowl panel positioned behind the connector; and
   a pair of protrusions provided on the housing;
   wherein each of the pair of protrusions is arranged on a corresponding lateral side of the connector when viewed from a front of the vehicle,
   back ends of the protrusions are positioned on a back side with respect to a back end of the connector, and
   a distance from the back end of one protrusion of the pair of protrusions to the cowl panel is shorter than a distance from the back end of the other protrusion to the cowl panel, the one protrusion being closer to a center line in a width direction of the vehicle than the other protrusion is.

2. The structure of claim 1, wherein the pair of protrusions are integrally formed with the housing.

3. The structure of claim 1, wherein the pair of protrusions are integrally formed with an upper cover of the housing.

* * * * *